(12) United States Patent
Gerstl et al.

(10) Patent No.: US 12,177,529 B2
(45) Date of Patent: *Dec. 24, 2024

(54) VIRTUAL SET TOP

(71) Applicant: Synamedia Limited, Staines Upon Thames (GB)

(72) Inventors: Enrique Gerstl, Maale Michmash (IL); Zorach Reuven Wachtfogel, Elazar (IL); Avi Fruchter, Neve Daniel (IL); Amit Chhabra, Bangalore (IN)

(73) Assignee: SYNAMEDIA LIMITED, Maidenhead (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,186

(22) Filed: Jul. 11, 2022

(65) Prior Publication Data

US 2022/0417611 A1 Dec. 29, 2022

Related U.S. Application Data

(63) Continuation of application No. 17/360,833, filed on Jun. 28, 2021, now Pat. No. 11,418,851.

(51) Int. Cl.
| | |
|---|---|
| *H04N 21/637* | (2011.01) |
| *H04N 19/172* | (2014.01) |
| *H04N 21/414* | (2011.01) |
| *H04N 21/431* | (2011.01) |
| *H04N 21/433* | (2011.01) |
| *H04N 21/438* | (2011.01) |
| *H04N 21/44* | (2011.01) |
| *H04N 21/472* | (2011.01) |
| *H04N 21/6379* | (2011.01) |

(52) U.S. Cl.
CPC ....... *H04N 21/6379* (2013.01); *H04N 19/172* (2014.11); *H04N 21/414* (2013.01); *H04N 21/431* (2013.01); *H04N 21/433* (2013.01); *H04N 21/4384* (2013.01); *H04N 21/44008* (2013.01); *H04N 21/47202* (2013.01)

(58) Field of Classification Search
CPC ............ H04N 19/172; H04N 21/6379; H04N 21/414; H04N 21/431; H04N 21/433; H04N 21/4384; H04N 21/44008; H04N 21/47202
USPC ..................................................... 375/240.01
See application file for complete search history.

(56) References Cited

U.S. PATENT DOCUMENTS

| 8,935,425 B2 | 1/2015 | Minder et al. |
| 9,742,749 B1 * | 8/2017 | Richter ................. H04L 63/068 |
| 10,693,642 B1 * | 6/2020 | Saxton .................... H04L 9/065 |

(Continued)

*Primary Examiner* — Dominic D Saltarelli
(74) *Attorney, Agent, or Firm* — Fernando & Partners, LLP

(57) ABSTRACT

Techniques for providing multimedia content in a virtual set top system are described. In some embodiments, a stream switchover method for UI rendering is performed at a device (e.g., a server) with one or more processors and a non-transitory memory. The server distributes a first stream that includes a plurality of frames. The server receives a request for a user interface (UI) from a client. In response to receiving the request, the server generates a second stream by locating an encoder to encode the plurality of frames into the second stream based on the first stream, instructing the encoder to accelerate encoding of the plurality of frames and facilitating blending of the UI into the second stream with the plurality of frames. The server then switches the client from the first stream to the second stream.

20 Claims, 12 Drawing Sheets

(56) References Cited

U.S. PATENT DOCUMENTS

| | | | |
|---|---|---|---|
| 10,785,511 B1* | 9/2020 | Lopez Hernandez | ........................ H04N 21/23805 |
| 11,223,873 B1* | 1/2022 | Keifer, III | ................ H04L 67/10 |
| 2002/0178278 A1* | 11/2002 | Ducharme | ............ H04N 21/443 348/E7.071 |
| 2006/0174026 A1* | 8/2006 | Robinson | ............ H04N 21/4782 709/231 |
| 2013/0162770 A1 | 6/2013 | Arakawa et al. | |
| 2016/0134910 A1 | 5/2016 | Davis et al. | |
| 2017/0337711 A1 | 11/2017 | Ratner et al. | |
| 2020/0275148 A1* | 8/2020 | Stockhammer | .... H04N 21/2668 |
| 2021/0105044 A1 | 4/2021 | Babich | |
| 2021/0152896 A1* | 5/2021 | Fisher | ................. H04N 21/8586 |
| 2021/0160548 A1 | 5/2021 | Ziskind et al. | |
| 2021/0281621 A1* | 9/2021 | Sodagar | .................. H04L 67/02 |

\* cited by examiner

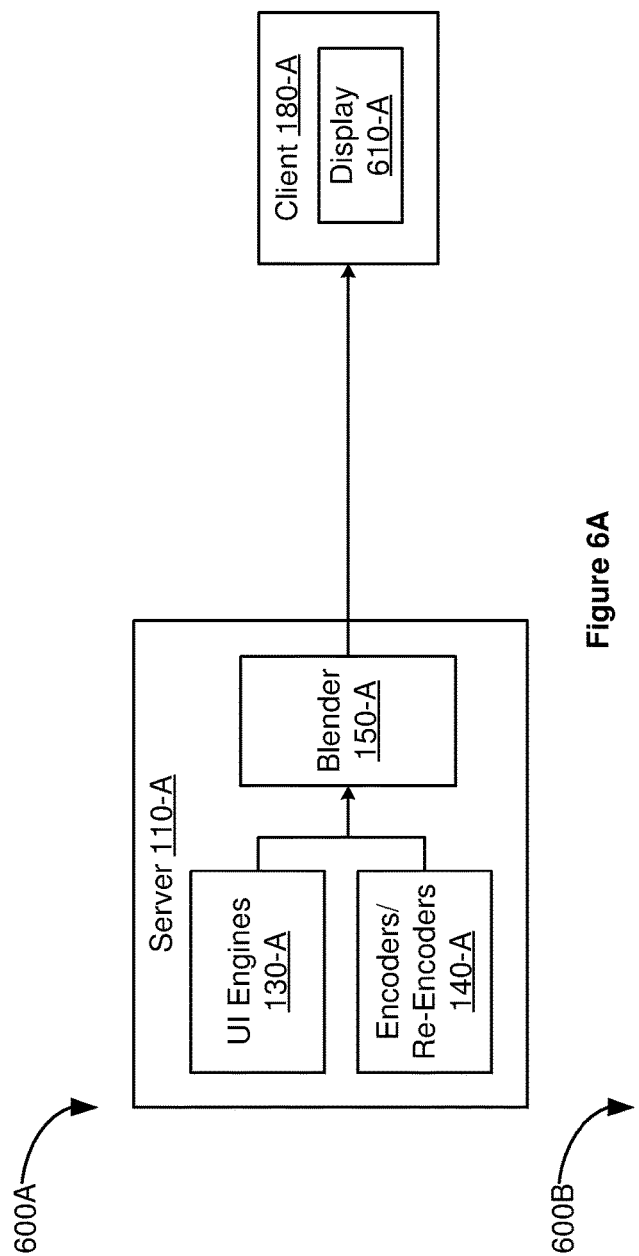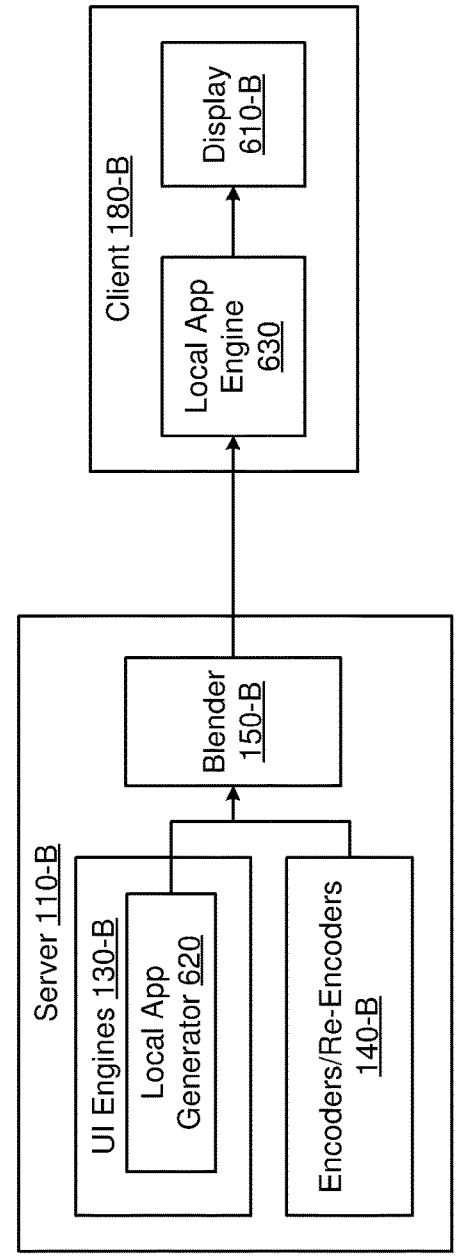

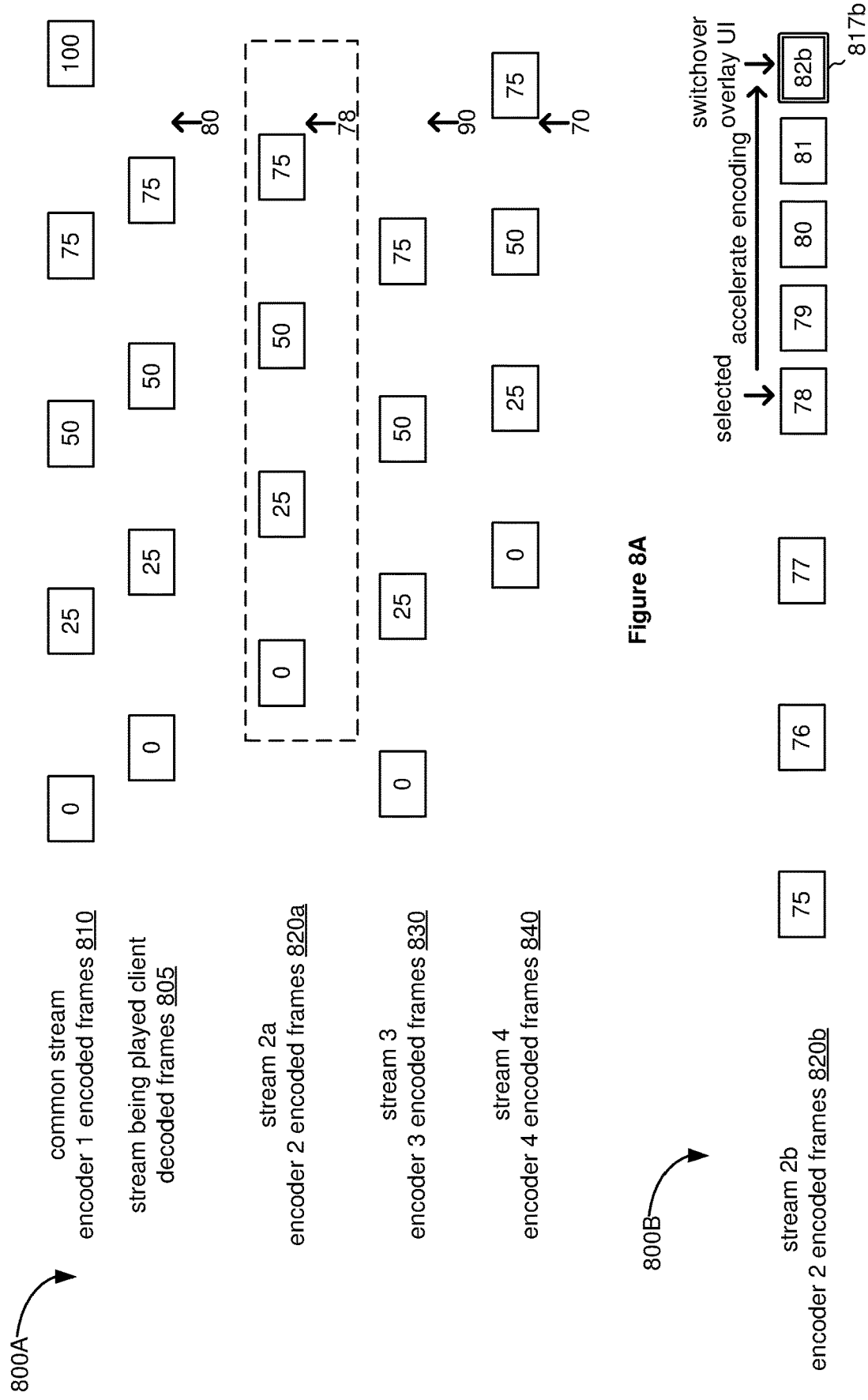

VIRTUAL SET TOP

CROSS-REFERENCE TO RELATED APPLICATIONS

This application is a continuation of U.S. patent application Ser. No. 17/360,833, filed on Jun. 28, 2021, and hereby incorporated by reference in its entirety.

TECHNICAL FIELD

The present disclosure relates generally to multimedia content delivery and, more specifically, to virtualizing set top for multimedia content delivery.

BACKGROUND

Moving client side applications such as generating graphic interface (UI) on set-top-boxes (STBs) into a virtualized 2-way environment is complex and costly. To deliver high quality and low latency streams to each client, previously existing systems attempt to provide each client its own dedicated stream. Such solutions are costly and inefficient because most watching sessions involve viewing common video feeds and the same UIs (e.g., overlays) are generated over and over from common data in the cloud.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIGS. 6A and 6B are block diagrams illustrating embodiments of hybrid UI rendering for display on client devices, in accordance with some embodiments;

FIGS. 8A-8C illustrate encoder selection and stream switchover in response to a request for a UI in the exemplary virtual set top system, in accordance with some embodiments;

Figure 1:
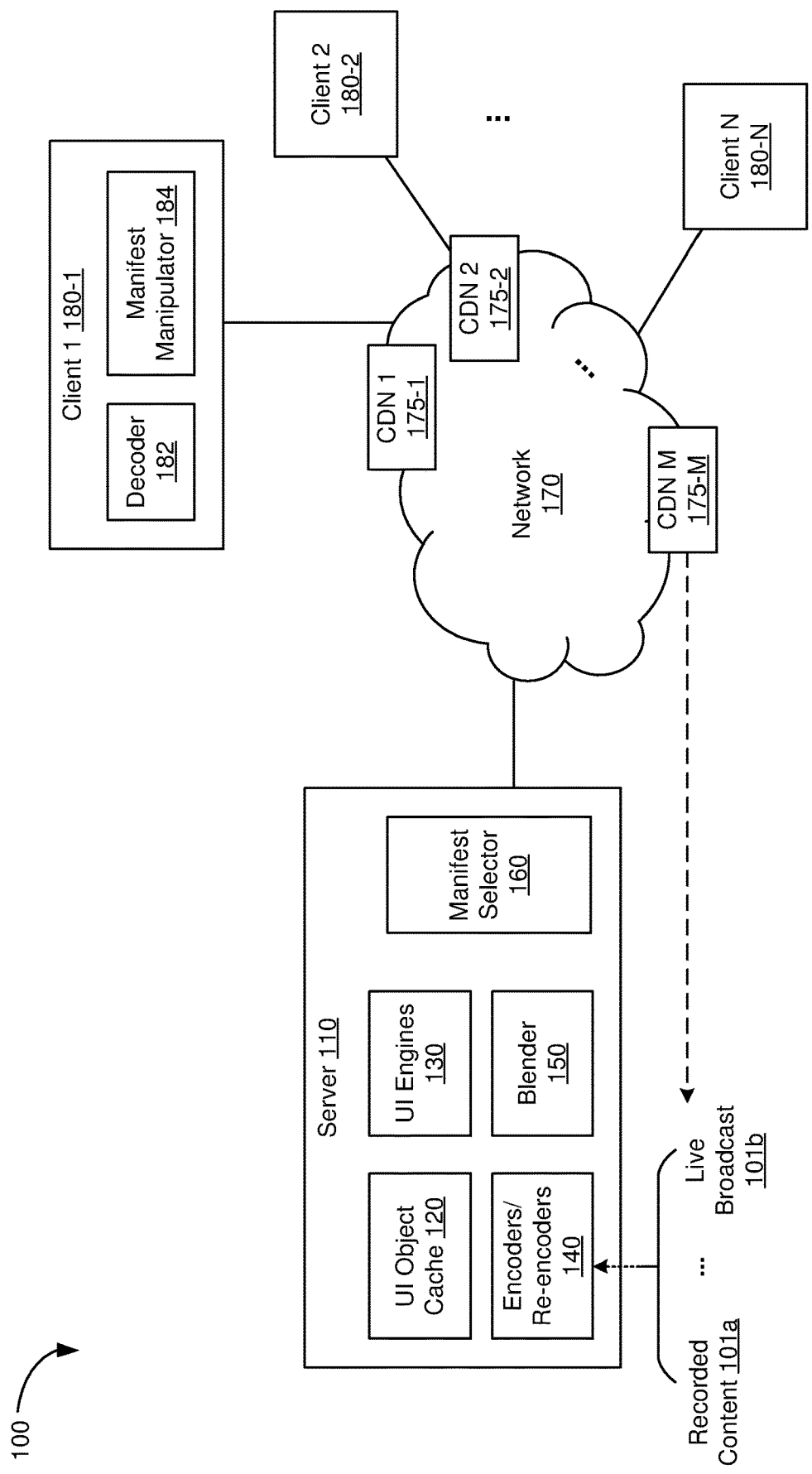
FIG. 1 is a block diagram of an exemplary virtual set top system for media content delivery, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, a virtual set top system described herein merges clients to common video segments when the clients are viewing videos and seamlessly switches to client dedicated segments (e.g., personal segments) when a particular client loads user interface (UI) element(s) relevant for display. As such, the system provides personalized UIs to each client without interrupting video streaming. In some embodiments, to improve the UI rendering efficiency, the system stores metadata and rendered UI objects in a shared cache for multiple clients. Further, in some embodiments, some portions of UIs are downloadable as local applications, and the client devices can utilize the local applications to render the portions locally (e.g., a grid with fast navigation). Thus, the seamless switching between a common stream and a unique stream, in combination with using the rendered UI objects in the shared cache and having parts of the UI rendered on the client and parts in the cloud, enables the virtual set top system described herein to efficiently deliver high quality multimedia content at low cost.

In accordance with various embodiments, a stream switchover method in response to a request for a UI is performed at a device (e.g., a server) with one or more processors and a non-transitory memory. The method includes distributing a first stream that includes a plurality of frames. The method further includes receiving a request for a user interface (UI) from a client. The method additionally includes generating a second stream in response to receiving the request, where the second stream is generated by locating an encoder to encode the plurality of frames into the second stream based on the first stream, instructing the encoder to accelerate encoding of the plurality of frames, and facilitating blending of the UI into the second stream with the plurality of frames. The method also includes switching the client from the first stream to the second stream.

Example Embodiments

The virtual set top system described herein solves the aforementioned performance and cost issues associated with virtualizing set-top-boxes (STBs). In some embodiments, a single virtualized process on the server side (e.g., in the cloud) manages multiple client devices on the server side and leverages caching of rendered user interface (UI) objects for improved efficiency. When multiple client devices are viewing videos, the virtual set top system provides common video segments to the multiple client devices in a common stream. When a particular client device sends a request for a UI while playing the videos, the virtual set top system seamlessly switches the particular client device from the common stream to a dedicated personal stream for high quality and low latency delivery of media content, which may include the rendered UI, videos, and/or the rendered UI blended with the videos. Additionally, in some embodiments, the virtual set top system adopts hybrid UI rendering for enhanced user experience. The hybrid UI rendering allows parts of a UI being rendered in the cloud and other parts of the UI being rendered locally on the client device. As such, with various optimizations described herein, the virtual set top system creates a technological and cost viable solution for high quality multimedia content delivery.

Reference is now made to FIG. 1, which is a block diagram of an exemplary virtual set top system 100 for media content delivery in accordance with some embodiments. The media content (also referred to herein after as "multimedia content", "media content item(s)", or "content") can include any multimedia data, such as visual data, audio data, and/or text, etc. In some embodiments, the media content delivery system 100 includes a server 110 (e.g., a headend and/or an edge device) that obtains media content from various sources, such as recorded content 101*a* and/or live broadcast 101*b*. The recorded content 101*a* and/or live broadcast 101*b* are raw (e.g., unencoded) in some embodiments. Alternatively, the recorded content 101*a* and/or live broadcast 101*b* are encoded and obtained by the server 110. The server 110 encodes and/or re-encodes the media content and delivers the encoded media content via a network 170 to a plurality of client devices 180 (also referred to hereinafter as the clients 180), e.g., client device 1 180-1, client device 2 180-2, . . . , client device N 180-N. In some embodiments, the network 170 further includes a plurality of content delivery networks 175 (CDNs), e.g., CDN 1 175-1, CDN 2 175-2, . . . , CDN M 175-M. The plurality of CDNs 175 caches media content and increases the content availability. As such, in some embodiments, the server 110 provides the encoded media content to the plurality of non-colocated client devices 180 via the plurality of CDNs 175, e.g., the server 110 is distinct and remote from the plurality of client devices 180.

In FIG. 1, the exemplary client device 1 180-1 includes a decoder 182 for decoding the received media content. Upon receiving the encoded media content, client device 1 180-1 decodes the media content for display. In some embodiments, the client devices 180 also include input device(s) (not shown) for receiving inputs from a user, e.g., a button, a voice recorder, a sensor, etc., and/or a network interface (not shown) for connecting to the network 170. Upon receiving an input from the user, where the input corresponds to one or more requests for one or more user interfaces (UIs), a respective client device 180 sends the request(s) to the server 110 and receives from the server 110 one or more rendered UIs along with media content in stream(s). In some embodiments, a respective client device 180 also includes a manifest manipulator 184 for transitioning between streams. As such, the manifest selector 160 on the server side, the manifest manipulator 184 on the client side, or a combination of both facilitates the delivery of the blended stream from the server 110 to the respective client device 180.

In some embodiments, the server 110 includes encoders/re-encoders 140 for encoding raw content (e.g., content that has not been compressed and/or encoded) from the recorded content 101*a* and/or the live broadcast 101*b*. In some embodiments, the encoders/re-encoders 140 include at least one decoder and at least one encoder, such that the server 110 obtains an encoded stream, decodes the stream, blends the UI(s) with the decoded stream, and re-encodes the blended stream. As shown by the dashed arrow in FIG. 1, in some embodiments, the server 110 can obtain the media content 101*a* and 101*b* from a variety of sources, including from one or more CDN instances 175.

It should be noted that although a single server 110 is illustrated in FIG. 1, the system 100 may include one or more servers 110 and/or devices and parts of the server 110 can be deployed on other devices. For example, parts of the server 110 can be deployed to the CDN(s) 175, and/or the UI object cache 120 can be external to the server 110, e.g., serving multiple instances of the server 110. In another example, although the encoders/re-encoders 140 are illustrated as part of the server 110 in FIG. 1, the encoders/re-encoders 140 can be distributed and/or separated from the server 110, e.g., not co-located on the same device. As such, an encoder or re-encoder 140 may be on a different device, in a different system, and/or at a different location to pre-encode the media content, such that the server 110 obtains pre-encoded stream(s) for further processing. In particular, in some embodiments, the encoding part of a re-encoder can be separated from the decoding part, e.g., a single decoder serving multiple UI engines 130 and/or supporting the encoding for multiple re-encoders. For the sake of simplicity, the subject matter will be described hereinafter for the most part with reference to a single server 110, but any parts of the single server 110, e.g., the UI object cache 120, the UI engines 130, the encoders 140, the re-encoders 140, the blender 150, and/or the manifest selector 160, among others, can be separate from each other and/or separate from the server 110.

In some embodiments, the server 110 also includes multiple UI engines 130 for rendering UIs for the plurality of client devices 180. In some embodiments, the server 110 further includes a shared UI object cache 120 for storing rendered UI objects, e.g., rendered images, that are shared by the multiple virtualized STBs. When the rendered UI objects (e.g., a poster or a banner) are shared between users and/or sessions, the server 110 runs multiple virtualized STBs in one application, such that the multiple virtualized STBs share a common layer of rendered images in accordance with some embodiments. This allows the UI objects generated for one user and/or session to be reused for another user and/or session without having to recompute to re-render the same images. As used herein, an application refers to an executable program, or a listing of instructions for execution, that defines a UI for display on a display device. The UI engines 130 are configured to include, for example, a web browser, a script interpreter, operating system, or other computer-based environment that is accessed during operations of an application.

In some embodiments, the server 110 further includes a blender 150 to blend rendered UI objects with videos. As will be described in further detail below with reference to FIGS. 6A and 6B, The UI objects include not only graphical elements and UI artifacts rendered by the UI engines 130 but also local applications generated by the UI engines 130 or data and metadata associated with the local applications. For example, a UI can include video components, such as live streaming of a local channel, as well as UI elements, such as a banner with the local channel information. In response to a request for such a UI, a UI engine 130 renders the banner on the server side, the blender 150 blends the rendered banner with the live video of the local channel into one stream. The server 110 then sends the blended stream to the client device 180 for display. The client device 180, upon receiving the blended stream, simply displays the blended stream, where in the blended stream, the banner is positioned by the blender 150 on top of the streaming local channel, e.g., as an overlay on top of the video. In some embodiments, when at least a portion of the UI is rendered by the local applications on the client device 180, the blender 150 facilitates blending relevant data, indicator(s), and/or metadata with the video components and the server 110 sends the blended stream to the client device 180. Upon receiving the blended stream, the client device 180 utilizes the data, indicator(s), and/or metadata for local UI rendering.

In some embodiments, the server 110 prepares the encoders/re-encoders 140 (e.g., in a ready-to-attach mode for UI blending) and maintains the encoders/re-encoders 140 (e.g., activating or deactivating) for virtual set top. In some embodiments, the server 110 includes an encoder controller (not shown) for preparing and maintaining the encoders/re-encoders 140 and for selecting a particular encoder/re-encoder 140 to generate a personalized stream in response to a request for a UI. The encoder controller, upon selecting the encoder/re-encoder 140, also instructs the encoder to accelerate the video encoding to ensure a seamless transition from one stream to another in accordance with some embodiments.

In some embodiments, the server 110 additionally includes a manifest selector 160 for providing links to the streams. In some embodiments, the links are provided to the plurality of client devices 180 in a manifest file for fetching the media content. As will be shown in FIGS. 7A-7C and described in further detail below, the manifest selector 160 facilitates the transitioning between a common stream and a respective dedicated stream in accordance with some embodiments. The transitioning can be triggered by and/or in response to actions on the client side and/or the server side.

For example, user actions on the client side, such as a button press, a hand gesture, a voice input, can be associated with a request for a UI and such user actions can trigger updates to links in manifest. In another example, events from the cloud, such as publishing a banner, a notice, a message, or an advertisement, can be associated with a request for a UI and such events can trigger updates to links in manifest. In the exemplary system 100, client device 1 180-1, through the manifest manipulator 184, links the manifest on the client device to the manifest selector 160 on the server side. In such embodiments, client device 1 180-1 plays the same stream from the server 110, while the manifest selector 160 on the server side returns links to a common video stream (e.g., common videos without UI) or links to unique personal segments (e.g., a unique stream with videos and the requested UI).

It should be noted that the virtual set top system 100 can include more, less, and/or different elements than shown in FIG. 1. As will be described in further detail below with reference to FIGS. 2A-2B and 6A-6B, each of the elements in the virtual set top system 100 can include more, less, and/or different sub-elements than shown in FIG. 1. Additionally, each of the elements in the virtual set top system 100 can include appropriate hardware, software, firmware, and/or virtual machines to perform the operations attributed to the element herein. Operation(s) attributed to an element in the virtual set top system 100 herein should not be considered binding and in some embodiments, other element(s) in the exemplary system 100 may additionally or alternatively perform such operation(s).

Figure 2B:
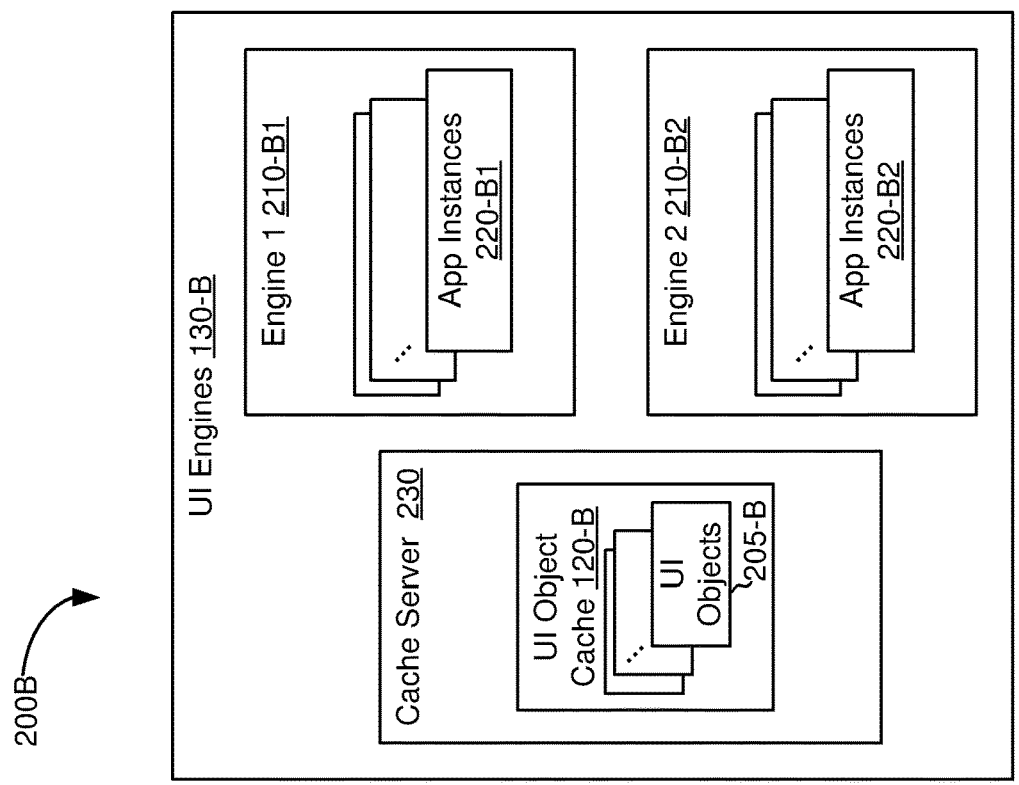
FIGS. 2A and 2B are block diagrams illustrating exemplary UI engines for user interface (UI) element caching and sharing, in accordance with some embodiments.
Figure 2A:
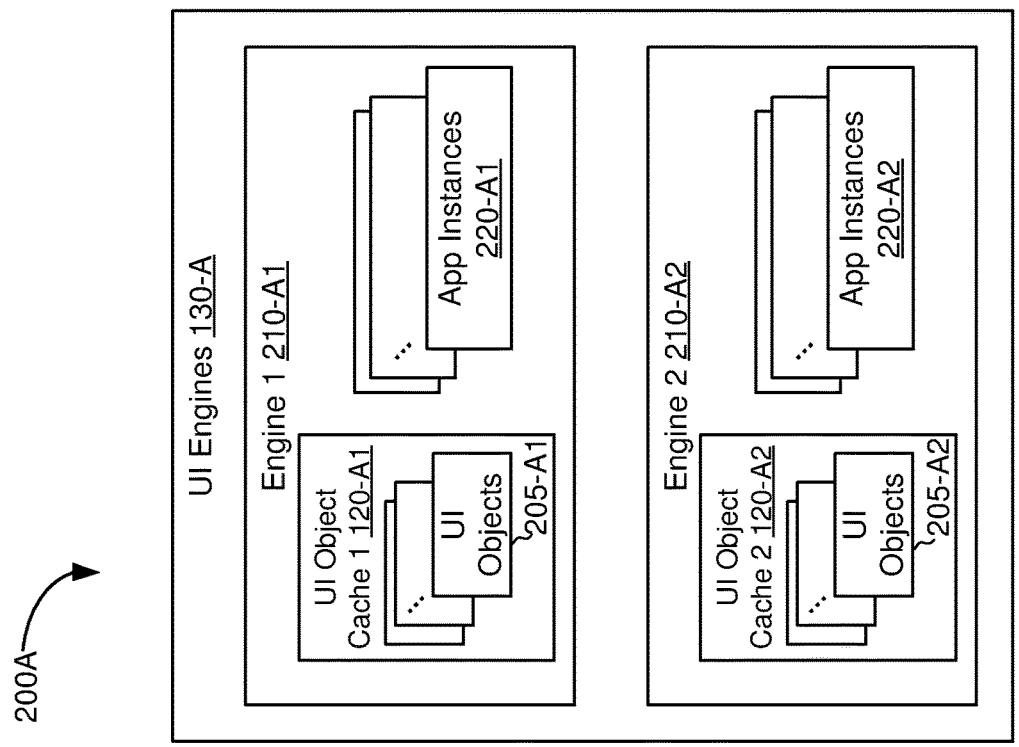

FIGS. 2A and 2B are block diagrams 200A and 200B illustrating exemplary UI engines 130A and 130-B for UI element caching and sharing in accordance with some embodiments. As explained above with reference to FIG. 1, the virtual set top system described herein allows multiple virtualized STBs to share a common layer of rendered graphics. The sharing can be among multiple application instances within a UI engine as shown in FIG. 2A and/or among multiple UI engines as shown in FIG. 2B.

In FIG. 2A, the UI engines 130-A (e.g., the UI engines 130, FIG. 1) include a pool of engines, e.g., engine 1 210-A1 and engine 2 210-A2, collectively referred to hereinafter as the engines 210-A. Each of the engines 210-A includes a shared UI object cache (e.g., as part of the UI object cache 120, FIG. 1). For instance, engine 1 210-A1 includes UI object cache 1 120-A1, which stores rendered UI objects 205-A1 shared among multiple application instances 220-A1. In another example, engine 2 210-A2 includes UI object cache 2 120-A2, which stores rendered UI objects 205-A2 shared among multiple application instances 220-A1. Each of the engines 210-A serves, for example, one application in the exemplary virtual set top system. Further, each of the application instances 220-A1 and 220-A2 corresponds to one virtualized STB and is responsible for rendering UIs associated with the application for a respective client device in accordance with some embodiments.

In FIG. 2B, the UI engines 180-B include a cache server 230 that is external to engine 1 210-B1 and engine 2 210-B2. The cache server 230 allows central caching of rendered UI objects 205-B stored in a UI object cache 120-B. The UI objects 205-B are shared by both engine 1 210-B1 and engine 2 210-B2, e.g., also shared by the application instances 220-B1 running by engine 1 210-B1 and the application instances 220-B2 running by engine 2 210-B2. For example, an application instance 220-B1 can look up the UI object cache 120-B in response to receiving a request for a UI. In the case of not finding a rendered UI object corresponding to a UI element of the UI in the UI object cache 120-B, the UI element is rendered and the rendered UI object is uploaded to the UI object cache 120-B. In some embodiments, upon detecting the newly rendered UI object in the UI object cache 120-B, the cache server 230 can decide whether to allow sharing of the UI object with other application instances and/or engines, e.g., whether to share with the application instances 220-B2 on engine 2 210-B2. In the case of allowing the UI object to be shared with the application instances 220-B2, the UI object can be retrieved from the UI object cache 120-B and reused by one of the application instances 220-B2 upon request.

It should be noted that although FIG. 2A illustrates UI object cache 1 120-A1 as part of engine 1 210-A1 and UI object cache 2 120-A2 as part of engine 2 210-A2, UI object cache 1 120-A1 can be separate and distinct from engine 1 210-A1 and UI object cache 2 120-A2 can be separate and distinct from engine 2 210-A2. Further, the UI object cache 1 120-A1 and UI object cache 2 120-A2 can be separate and distinct from UI engines 130-A. Likewise, the cache server 230 shown in FIG. 2B can be part of the UI engines 130-B or on a separate virtual machine, instance, and/or device. Further, the UI engines 130-A and 130-B can include more, less, and/or different elements than shown in block diagrams 200A and 200B for UI rendering. For example, a UI engine controller (not shown) can be used by the server for selecting a UI engine and/or an application instance for UI rendering. Those skilled in the art will appreciate from the present disclosure that various other features and configurations have not been illustrated for the sake of brevity, and so as not to obscure more pertinent aspects of the embodiments disclosed herein.

Figure 3:
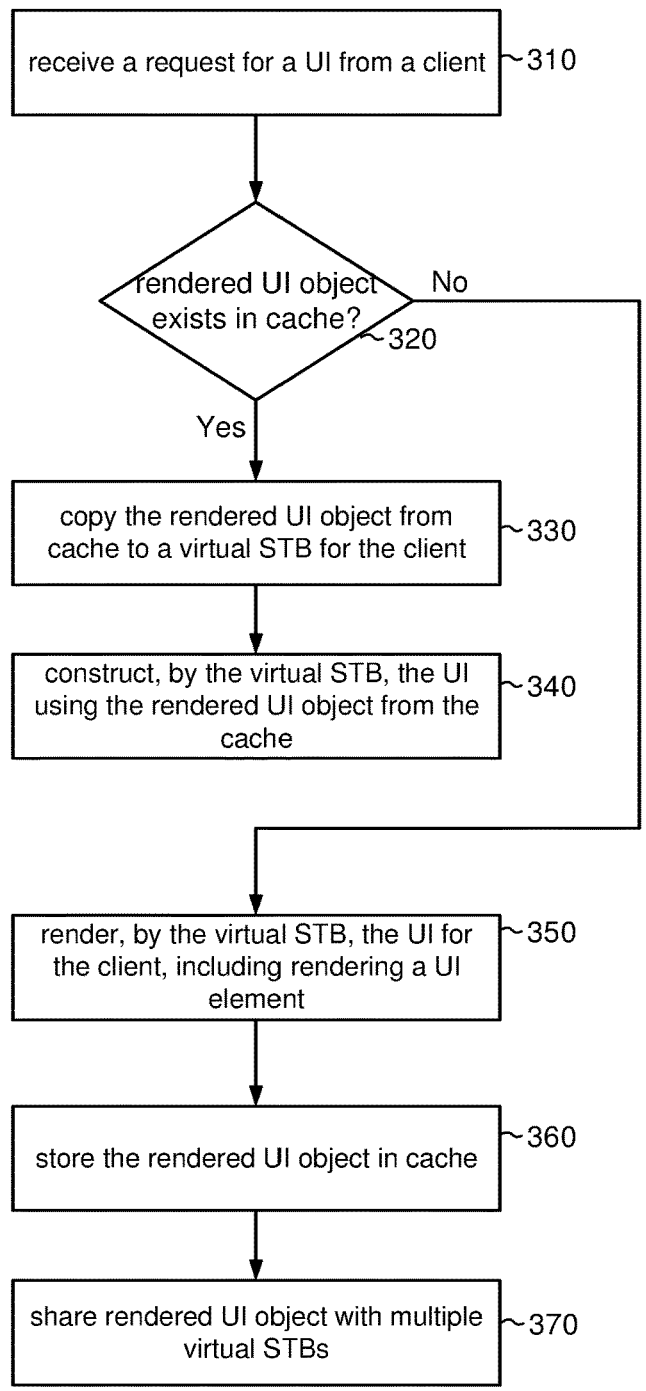
FIG. 3 is a flowchart illustrating a method of sharing UI objects in the exemplary virtual set top system, in accordance with some embodiments.

FIG. 3 is a flowchart illustrating a method 300 of sharing UI objects in a virtual set top system in accordance with some embodiments. In some embodiments, the method 300 is performed on the server 110 (FIG. 1), e.g., by the UI engines 130 (FIG. 1). Because many of the graphical elements are shared between users and/or watch sessions, e.g., a poster of an event on a channel, the server 110 as described above reference to FIG. 1 provides multiple virtualized STBs (e.g., the application instances 220-A1 and 220-A2 in FIG. 2A or the application instances 220-B1 and 220-B2 in FIG. 2B) in one application and a common layer of rendered UI objects shared by the multiple virtualized STBs. For example, the UI object cache 120 is shared by UI engines 130 in FIG. 1. In another example, the UI object cache 1 120-A1 is shared by the application instances 220-A1 and the UI object cache 2 120-A2 is shared by the application instances 220-A2 in FIG. 2A. In yet another example, the UI object cache 120-B is shared by the applications instances 220-B1 and 220-B2 in FIG. 2B.

In some embodiments, when a respective virtualized STB receives a request for a UI from a client (e.g., one of the client devices 180, FIG. 1), as represented by block 310, the respective virtualized STB identifies UI elements within the UI and checks whether a rendered UI object corresponding to a UI element of the UI exists in the UI object cache, as represented by decision block 320. In the case of finding a rendered UI object corresponding to a UI element in the UI object cache ("Yes"-branch from block 320), the respective virtualized STB forgoes rendering the UI element. Instead, as represented by block 330, the respective virtualized STB copies the UI object from the UI object cache 120 (FIG. 1). Further, as represented by block 340, the respective virtualized STB constructs the UI using the rendered UI object from the cache, e.g., using the copied UI object for UI composition, thus improving the efficiency of UI rendering.

On the other hand, in the case of not finding an UI object corresponding to a UI element of the UI in the UI object cache 120 (FIG. 1) ("No"-branch from block 320), the respective virtualized STB renders the UI for the client, including rendering a UI element of the UI, as represented by block 350. Once rendered, the respective virtual set top further stores the rendered UI object in the UI object cache 120 (FIG. 1), as represented by block 360. Additionally, the respective virtual set top indicates that the stored UI object can be shared with other virtualized STBs to reduce duplications and improve rendering efficiency, as represented by block 370. In some embodiments, the stored UI object is shared with multiple instances of a UI engine (as shown in FIG. 2A) or across multiple UI engines (as shown in FIG. 2B).

Figure 4:
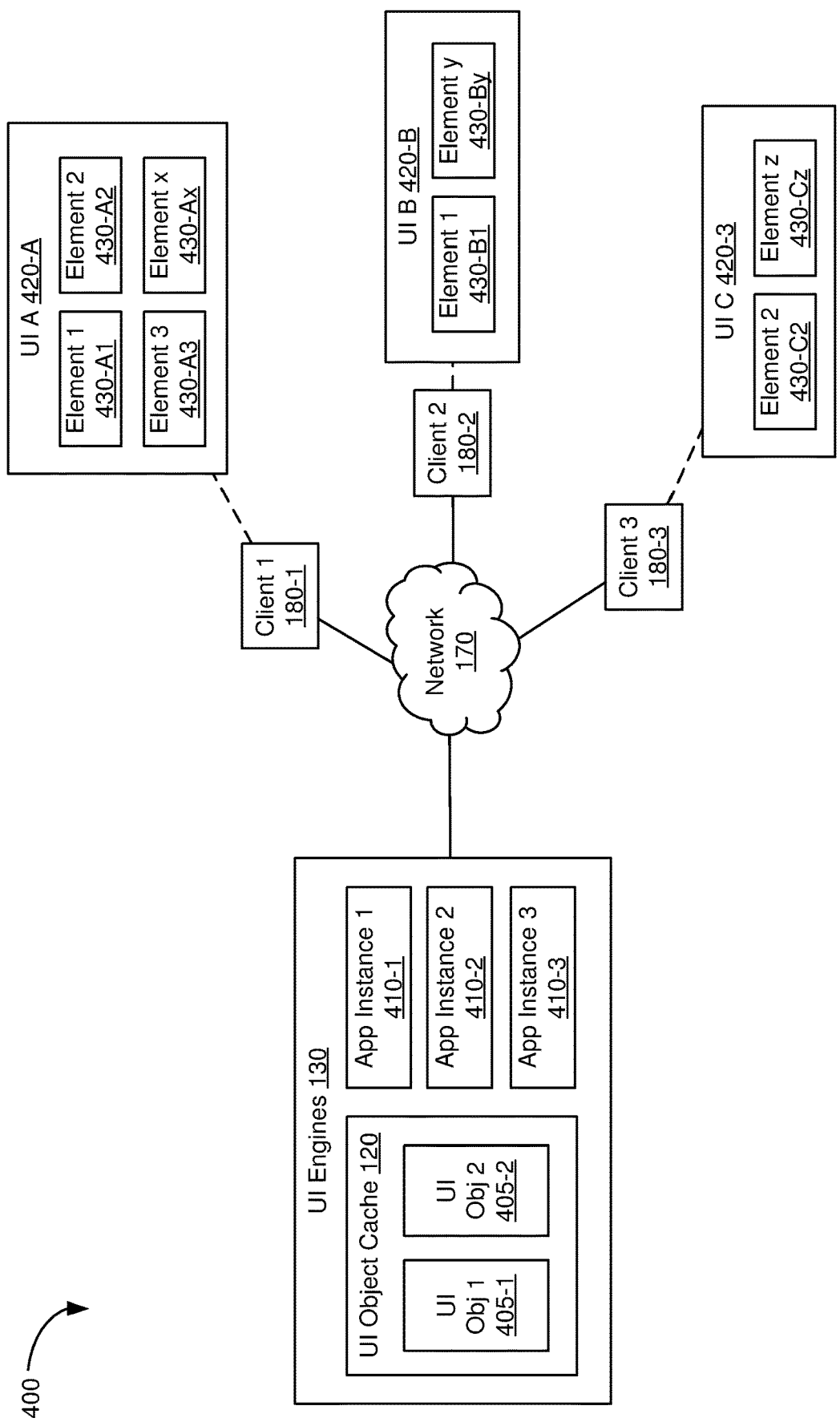
FIG. 4 is a block diagram illustrating using shared UI objects for UI rendering in the exemplary virtual set top system, in accordance with some embodiments.

FIG. 4 is a diagram illustrating an exemplary virtual set top environment 400 for UI object sharing in accordance with some embodiments. In the exemplary virtual set top environment 400, the UI engines 130 run multiple application instances 410 to provide virtualized STBs for the multiple client devices 180, e.g., application instance 1 410-1 as a virtualized STB for client device 1 180-1, application instance 2 410-2 for client device 2 180-2, and application instance 3 410-3 for client device 3 180-3. The multiple application instances 410 render personalized UIs for the client devices 180, e.g., application instance 1 410-1 rendering UI A 420-A for client device 1 180-1, application instance 2 410-2 rendering UI B 420-B for client device 2 180-2, and application 3 410-3 rendering UI C 420-C for client device C 180-C.

In the exemplary environment 400, UI A 420-A requested by client device 1 180-1 includes UI element 1 430-A1, UI element 2 430-A2, UI element 3 430-A3, and UI element x 430-Ax, collectively referred to hereinafter as the UI elements 430-A. UI B 420-B requested by client device 2 180-2 includes UI element 1 430-B1 and UI element y 430-By, collectively referred to hereinafter as the UI elements 430-B. UI C 420-C requested by client device 3 180-3 includes UI element 2 430-C2 and UI element z 430-Cz, collectively referred to hereinafter as the UI elements 430-C. In some embodiments, each of the application instances 410 is unique for the active viewing session, e.g., per active profile, active user, and/or active device, etc. Further, in some embodiments, each of the application instances 410 has its own state, e.g., rendering the beginning of a movie or the middle of an advertisement, etc. Thus, each of the application instances 410 as a virtualized STB renders personalized UIs for the corresponding client device 180.

The exemplary shared environment 400 includes the UI object cache 120, as described above with reference to FIGS. 1 and 2A-2B for storing rendered UI objects 405, e.g., UI object 1 405-1 and UI object 2 405-2. The rendered UI objects 405 are shared by the multiple application instances 410, e.g., shared by application instance 1 410-1, application instance 2 410-2, and application instance 3 410-3. Among the UI elements 430-A, 430-B, and 430C, UI element 1 430-B1 in UI B 420-B is the same as UI element 1 430-A1 in UI A 420-A, e.g., the same poster of the same event on the same channel. Likewise, UI element 2 430-B2 in UI B 420-B is the same as UI element 2 430-A2 in UI A 420-A.

Following the UI object sharing method 300 described above, once either application instance 1 410-1 or application 2 410-2 renders UI element 1 430-A1 or UI element 1 430-B1 and stores the rendered UI element as UI object 1 405-1 in the UI object cache 120, any one of the application instances 410 can use rendered UI object 1 405-1 without having to re-render the same graphic element. In another example, once either UI element 2 430-A2 or UI element 2 430-C2 is rendered and stored as UI object 2 405-2 in the UI object cache 120, any one of the application instances 410 can use rendered UI object 2 405-2 without having to re-render the same graphic element. As such, by not having each application instance 410 render the same UI elements that have already been rendered by another application instance 410 for a different viewing session, the UI engines 130 save computational resources and improve cloud rendering efficiency.

Figure 5:
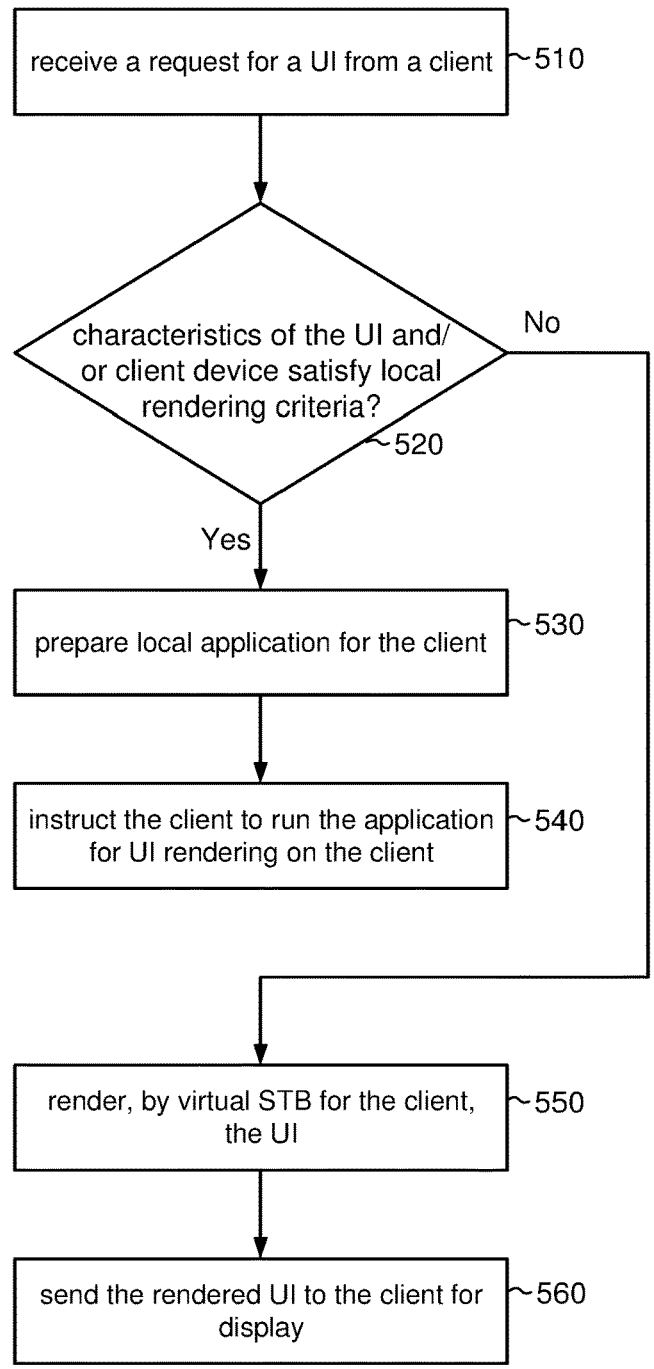
FIG. 5 is a flowchart illustrating a hybrid UI rendering method, in accordance with some embodiments.

FIG. 5 is a flowchart illustrating a hybrid UI rendering method 500 in a virtual set top system (e.g., the virtual set top system 100, FIG. 1) in accordance with some embodiments. In some embodiments, the method 500 is performed on the server 110 (FIG. 1) by one of the UI engines 130 (FIG. 1). Specifically, in some embodiments, the method 500 is performed at a virtualized STB, such as one of the application instances running on a respective UI engine (e.g., one of the application instances 320-A1 and 320-A2 in FIG. 3A, one or the application instances 320-B1 and 320-B2 in FIG. 3B, or one of the application instances 410 in FIG. 4).

The method 500 begins with a respective UI engine receiving a request for a UI from a client device, as represented by block 510. The method 500 continues with the respective UI engine analyzing the request and/or the requested UI to determine whether the UI can be at least partially rendered on the client device, as represented by block 520, e.g., based on UI complexity, user interactions associated with the UI, amount of personalization of the UI, and/or processing and networking capability of the client device, etc. In the case of allowing client device to render at least part of the UI ("Yes"-branch from block 520), the server prepares a local application for the client device, as represented by block 530, and instructs the client device to run the application locally for at least part of the UI rendering on the client device, as represented by block 540. For example, the server can generate a local application for the client device to download, where the local application can be loaded to the client device any time, e.g., at bootup, during a scheduled update, and/or when a UI event is sent. In some embodiments, the server prepares the local application for the client device by triggering the local application to be executed, e.g., indicating to the client device to load the local application and/or supplying relevant data for the local application. On the other hand, in the case of not allowing the client device to render at least part of the UI ("No"-branch from block 520), the server renders, e.g., by the virtualized STB, the UI for the client device, as represented by block 550, and sends the rendered UI to the client device for display, as represented by block 560.

For example, FIGS. 6A and 6B are block diagrams 600A and 600B illustrating various embodiments of hybrid UI rendering for display on client devices. In FIG. 6A, a server 110-A (e.g., the server 110 in FIG. 1) includes UI engines 130-A (e.g., the UI engines 130 in FIG. 1) for rendering UIs, encoders/re-encoders 140-A (e.g., the encoders/re-encoders 140 in FIG. 1) for encoding videos, and a blender 150-A (e.g., the blender 150 in FIG. 1) for blending the rendered UIs with the videos into stream(s). The server 110-A delivers the blended stream(s) to a client device 180-A (e.g., the client device 180 in FIG. 1) for display on a display 610-A. Thus, for a simple UI that does not require ongoing responses, it is more cost effective to render the UI by the UI engines 130-A and blend by the blender 150-A with videos from encoders/re-encoders 140-A on the server 110-A for the client device 180-A.

In FIG. 6B, similar to FIG. 6A, a server 110-B (e.g., the server 110 in FIG. 1) includes UI engines 130-B (e.g., the UI engines 130 in FIG. 1) for rendering UIs, encoders/re-encoders 140-B (e.g., the encoders/re-encoders 140 in FIG. 1) for encoding videos, and a blender 150-B (e.g., the blender 150 in FIG. 1) for blending the UIs with the videos. Different from the UI engines 130-A that generate rendered graphical images, in some embodiments, the UI engines 130-B include a local application generator 620 that generates one or more local applications for a client 180-B (e.g., the client device 180 in FIG. 1) as part of the UI or providing data, metadata, and/or indicator(s) associated with the one or more local applications.

As explained above with reference to FIG. 5, the one or more local applications can be downloaded and/or loaded any time. As such, in some embodiments, the one or more local applications are downloaded separately from the videos (e.g., delivered out-of-band, not blended with the videos, and/or using a separate delivery path), while in some other embodiments, the one or more local applications are then blended with the videos from the encoders/re-encoders 140-B by the blender 150-B. In some embodiments, the blender 150-B blends data, metadata, and/or indicator(s) with the videos. On the client side, the client device 180-B includes a local application engine 630 for detecting and/or receiving the one or more local applications, data, metadata, and/or indicator(s) blended with the videos. The local application engine 630 then downloads and/or executes the one or more local applications according to the data, metadata, and/or indicator(s). In some embodiments, the one or more local applications render UI element(s) locally on the client device 180-B over the videos for display on a display 610-B.

The hybrid UI rendering as shown in FIG. 6B improves user experience for rendering UIs such as TV guides that involve fast navigation and/or deep personalization, e.g., a UI with a degree of personalization exceeding a threshold and/or the amount of UI user interaction exceeding a threshold. The UI engines 130-B utilize the local application generator 620 to prepare one or more local applications associated with the TV guide for the client device 180-B, e.g., one local application for a channel in the TV guide. Upon receiving the one or more local applications, data, metadata, and/or indicator(s) associated with the one or more local applications, the local application engine 630 downloads and/or runs the one or more local applications when a user selects one or more tiles on the TV guide. According to the data, metadata, and/or indicators associated with the one or more local applications, the client device 180-B can render the TV guide as an overlay on top of the videos, render the TV guide without the videos in the background, and/or render the TV guide while pausing the videos until receiving further instructions to start. In some embodiments, the UI element is rendered on a transparent or semitransparent surface with a higher order over the videos without obscuring the videos. As such, for a UI such as the TV guide, allowing the local application engine 630 to facilitate client side UI rendering improves user experience and reduces rendering latency.

Figure 7A:
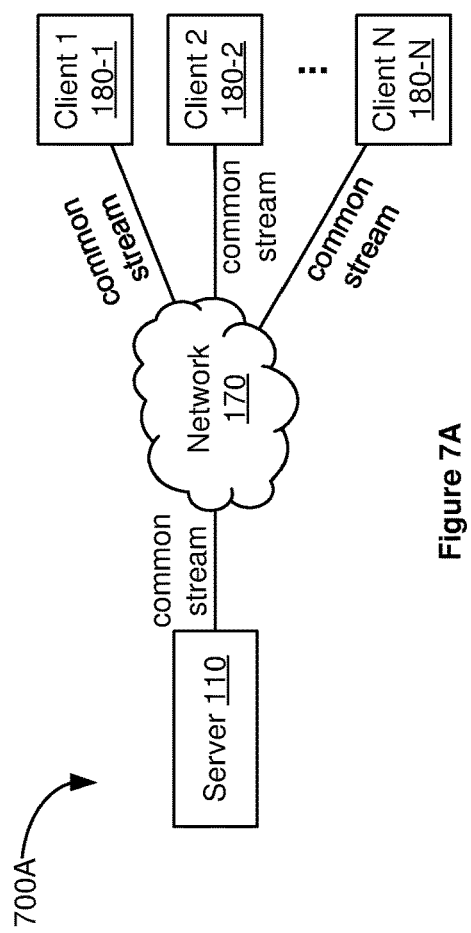
FIGS. 7A-7C are block diagrams illustrating transitioning between streams in the exemplary virtual set top system, in accordance with some embodiments.
Figure 7B:
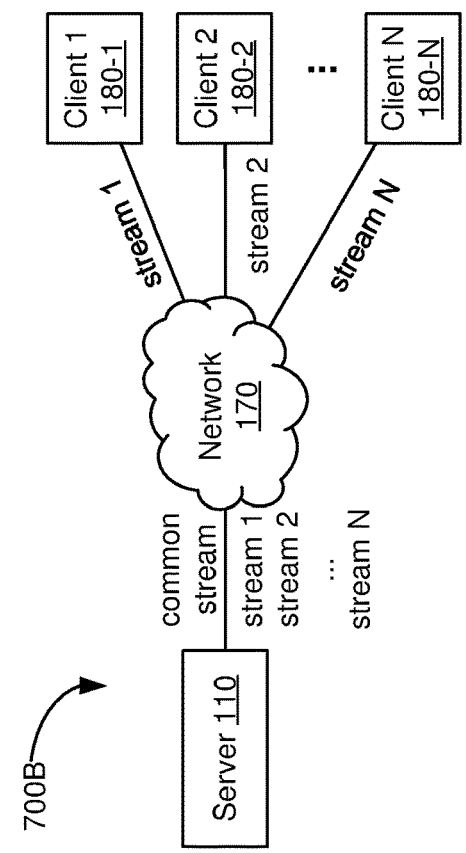
Figure 7C:
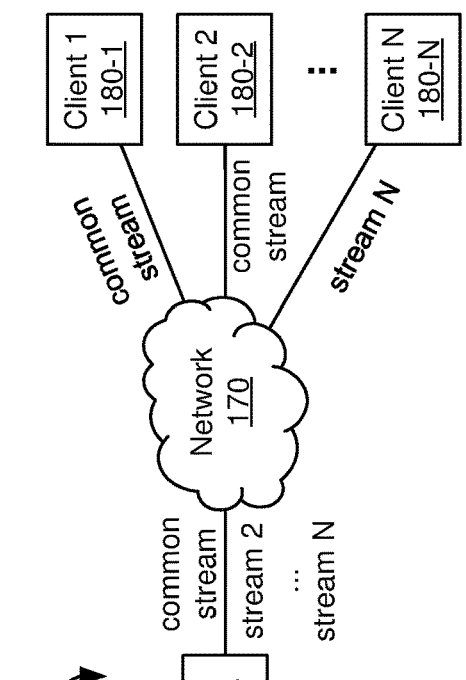

FIGS. 7A-7C are block diagrams 700A-700C illustrating transitioning between streams in an exemplary virtual set top system (e.g., the virtual set top system 100, FIG. 1) in accordance with some embodiments. In FIG. 7A, when users of the plurality of client devices 180 request videos without UIs, links pointing to the common stream (e.g., the video stream) are obtained by the client devices 180, e.g., with the manifest selector 160 (FIG. 1) returning the links to the CDNs 175 (FIG. 1) in the network 170 and/or through the manifest manipulator 184 (FIG. 1). As such, the videos, which are encoded by one video encoder in accordance with some embodiments, are fetched from one common stream and distributed to the plurality of client devices 180. Relative to previously existing solutions, which allocate a full video encoder for each view session, the virtual set top system described herein uses a common encoded video and merges clients to common video segments when the users are viewing videos without UI, thus reducing redundancy and realizing cost savings.

In FIG. 7B, links pointing to dedicated streams are obtained by the client devices 180 in response to UI requests. For example, the manifest selector 160 (FIG. 1) can return a link pointing to stream 1 for client device 1 180-1 in response to actions for one UI from client device 1 180-1, return a link pointing to stream 2 for client device 2 180-2 in response to actions for another UI from client device 2 180-2, and return a link pointing to stream N for client device N 180-N in response to actions for yet another UI, etc. In FIG. 7C, once the UI visibility ends, e.g., the requested UI is no longer displayed or visible on client device 1 180-1, the manifest selector 160 (FIG. 1) can return a link pointing to the common stream for both client device 1 180-1 and client device 2 180-2, thus merging client device 1 180-1 and client device 2 180-2 back to the common video segments.

As shown in FIGS. 7A and 7B, in response to a request for a UI (e.g., triggered by actions from the client side and/or the server side), the virtual set top system described herein transitions from the common stream to the unique streams (with videos and UI) for high quality and low latency delivery of dedicated and/or personal segments. As shown in FIG. 7C, when the visibility of the UI ends, e.g., the UI element is no longer displayed on client device 1 180-1 and client device 2 180-2, the virtual set top system described herein merges the client devices 180 back to the common stream for cost savings. As such, relative to previously existing solutions, the virtual set top system described herein improves efficiency, lowers cost, and delivers high quality media content.

Figure 8C:
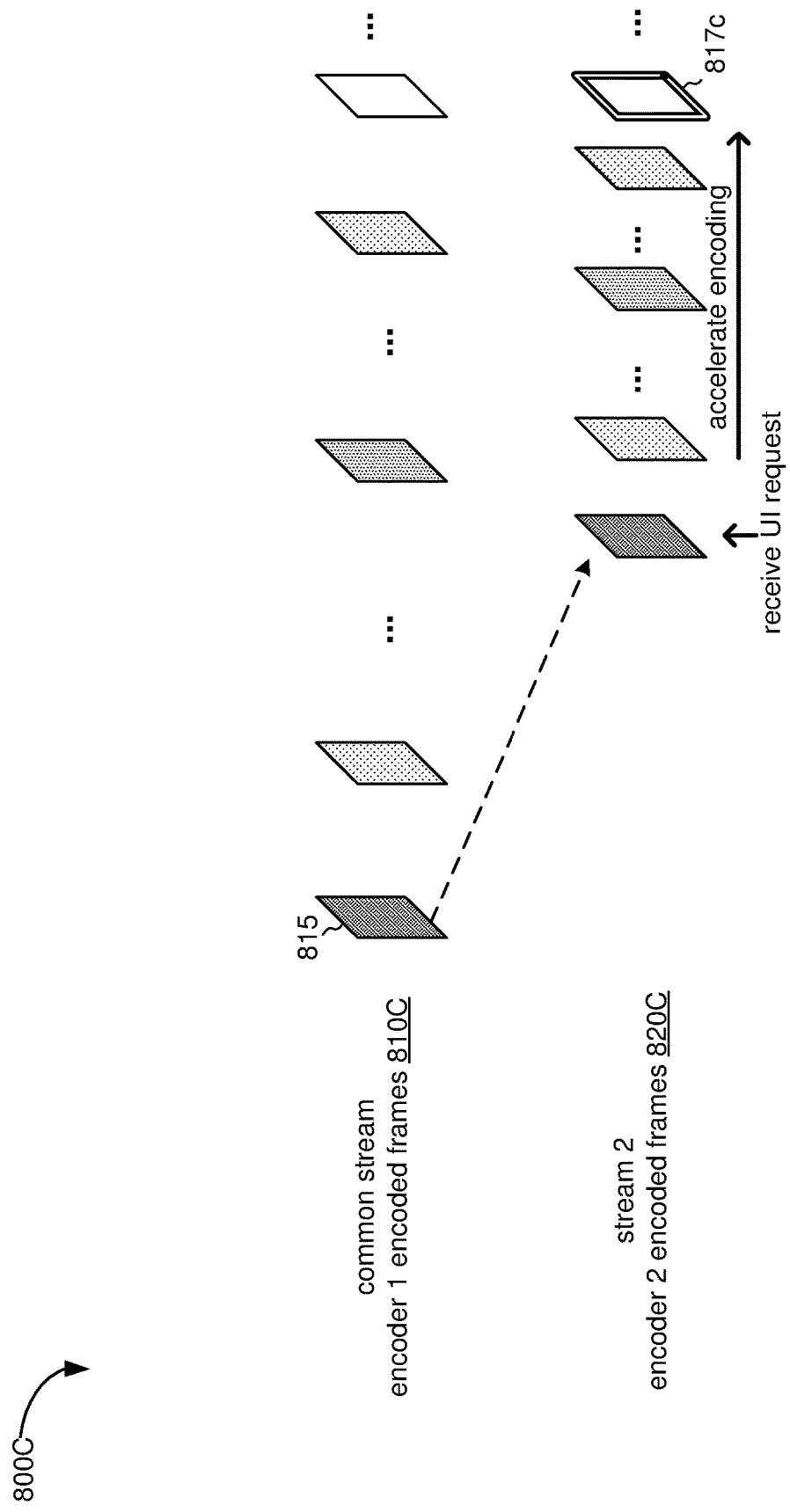

FIGS. 8A-8C are diagrams 800A-800C illustrating encoder selection and stream switchover in response to a request for a UI in an exemplary virtual set top system (e.g., the virtual set top system 100, FIG. 1) in accordance with some embodiments. The encoder selection and the stream switching as shown in FIGS. 8A-8C are performed on the server side, e.g., by the server 110 in FIG. 1. In some embodiments, the server prepares and maintains a pool of encoders and possibly a pool of re-encoders, e.g., the encoders/re-encoders 140 in FIG. 1. Thus, in some embodiments, the server includes an encoder controller for maintaining the pool of encoders/re-encoders and for selecting an encoder/re-encoder from the pool of encoders/re-encoders upon request. As used herein, the term "encode" also applies to "re-encode" and an "encoder" also corresponds to the re-encoding part in an "re-encoder". For example, in some cases, when the server prepares a re-encoder, the server instructs the re-encoder to prepare re-encoding of a stream after decoding the stream.

In FIG. 8A, a common stream 810 includes a plurality of frames. The common stream 810 is encoded, for example, by encoder 1. The server prepares the pool of encoders, e.g., encoder 1, encoder 2, encoder 3, and encoder 4, by instructing the pool of encoders to encode the plurality of frames with varying delays relative to the common stream 810. For example, streams 2a and 3-4 820a and 830-840 are encoded by encoders 2-4 with varying amounts of delays relative to the common stream 810. In particular, encoder 2 encodes the plurality of frames into stream 2a 820-a with slightly more delay than stream 3 830 encoded by encoder 3, but less delay than stream 4 840 encoded by encoder 4.

In some embodiments, client devices report to the server their offsets of decoded positions from the video being played. In such embodiments, the server sets up encoders 2-4 in a ready-to-attach mode by mimicking the decoding offset of the client. As such, encoders 2-4 encode the same input stream as the common stream 810, e.g., encoding the same plurality of frames, and encode near (e.g., within a threshold delay) where the client device is decoding.

For example, in FIG. 8A, the client device reports that due to processing and/or network delays, the client device is decoding frame 80 in a stream 805 being played, while encoder 1 has encoded beyond frame 80 in the common stream 810. Based on the client-reported offset, the server prepares encoders 2-4 such that the delays of encoding the plurality of frames by encoders 2-4 are within a threshold (e.g., within a number of frames and/or sub-seconds, etc.) from the offset of decoded position from the client device. As a result, at the time of the request for the UI, encoder 2 is encoding frame 78 in stream 2a 820a, encoder 3 is encoding frame 90 in stream 3 830, and encoder 4 is encoding frame 70 in stream 4 840. Thus, relative to the position decoded by the client device at frame 80, stream 2a 820a encoded by encoder 2 is the closest to the stream 805 being played by the client. In other words, the server identifies a respective delay relative to the offset of decoded position for each of the pool of encoders, e.g., relative to the decoded position 80 in the stream 805 being played by the client device, the server identifies that encoder 2 delays encoding stream 2a 820a by 2 frames at frame 78, stream 3 830 encoded by encoder 3 is ahead by 10 frames at frame 90, and encoder 4 delays encoding stream 4 840 by 10 frames at frame 70. Accordingly, the server selects encoder 2 from the pool of encoders 2-4 based on frame 78 being the closest to the offset of decoded position at frame 80.

In FIG. 8B, having selected encoder 2 for providing personalized segments to the client, the server (e.g., with an encoder controller) instructs encoder 2 to generate a variant stream 2b 820b by quickly encoding/re-encoding frames 79, 80, and 81 to close the gap. Further, in some embodiments, the server (e.g., with the blender 150, FIG. 1) starts to overlay the UI from frame 82 onwards and encodes the video combined with the UI. The server then sends the variant stream 2b 820b to the client starting from a variant frame 82b 817b instead of the common stream 810, e.g., by updating the manifest through the manifest selector 160 and/or the manifest manipulator 184 in FIG. 1. On the client side, because the decoded stream prior to frame 82b 817b in the common stream 810 (e.g., frames 78-81) is the same as in stream 2b 820b, e.g., the same frames 78-81, the switchover from the common stream 810 to stream 2b 820b is seamless. In some embodiments, once the UI ends, e.g., the visibility of the UI ends, the server switches the client from stream 2b 820b back to the common stream 810.

It should be noted that in the embodiments shown in FIGS. 8A and 8B, the switchover point, e.g., frame 82, can be a reference frame or a non-reference frame. In other words, the switchover point can be at the beginning of a segment or in a segment. For example, frame 82b in FIG. 8B can be its own I-frame. Alternatively, encoder 2 for generating the variant stream 820b may be capable of using the frames from encoder 1 (or decoding the frames from the common stream 810) as the reference frames for encoding frame 82b. As such, the client can download from the common stream 810 and display up to frame 81 and seamlessly switch over to downloading from stream 2b 820b starting from frame 82b, whether frame 82b is at the beginning of a segment, e.g., an I-frame, or in the middle of a segment, e.g., frame 82b referencing frame 81.

In some embodiments, instead of maintaining a pool of busy encoders, with fast enough encoders and frequent enough key frames, the server selects any encoder that is available and can be activated to serve a request for a UI. In FIG. 8C, encoder 1 encodes a plurality of frames into a common stream 810C, where the plurality of frames includes a key frame 815, e.g., an I-frame 815. When the server receives a request for a UI from a client, the server determines that encoder 1 is available and can be activated, e.g., with sufficient processing capacity and can encode at a rate faster than a threshold bit-per-second. Further, once the server determines that the common stream 810C has a key frame interval less than a threshold, e.g., having frequency enough key frames, the server activates encoder 2 and provides frames starting from the last key frame in the common stream 810C to encoder 2, e.g., providing the frames starting from the key frame 815 to encoder 2. The server further instructs encoder 2 to generate a variant stream 2 820C by quickly encoding frames starting from the key frame 815 in accordance with some embodiments. In some embodiments, the server also starts to overlay the UI from a frame 817c onwards. The server then sends the variant stream 2 820C to the client starting at the variant frame 817c. Accordingly, the client can switch over to stream 2 820C without incurring severe latency.

Figure 9:
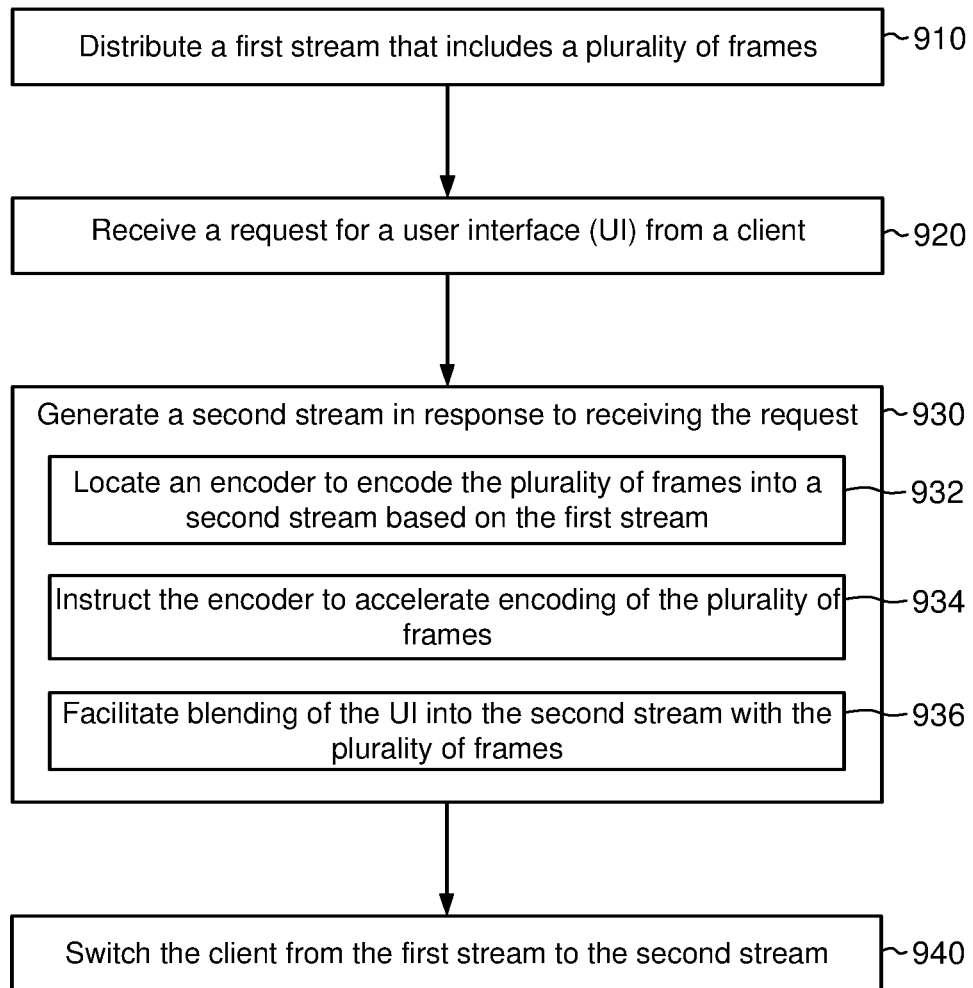
FIG. 9 is a flowchart illustrating a stream switchover method in the exemplary virtual set top system, in accordance with some embodiments.

FIG. 9 is a flowchart illustrating a stream switchover method 900 in response to a request for a UI in an exemplary virtual set top system (e.g., the virtual set top system 100, FIG. 1) in accordance with some embodiments. In some embodiments, the stream switchover method 900 is performed on a server, e.g., the server 110 in the virtual set top system 100, FIG. 1, where the server includes one or more processors and a non-transitory memory.

The method 900 begins with the server distributing a first stream that includes a plurality of frames, as represented by block 910. For example, the first stream can be a video stream that is encoded by one of the encoder(s)/re-encoder(s) 140 in FIG. 1. In some embodiments, the server obtains the first stream that is pre-encoded, e.g., encoded by an encoder distinct and separate from the server. Upon request, the server distributes the common video stream to a plurality of client devices, e.g., via links pointing to the common stream provided by the manifest.

The method 900 continues with the server (e.g., the UI engines 130, FIG. 1) receiving a request for a UI from a client, as represented by block 920. In response to receiving the request, the server generates a second stream, as represented by block 930. In some embodiments, the second stream is generated by the server (e.g., an encoder controller) locating an encoder to encode the plurality of frames into a second stream based on the first stream, as represented by block 932, and by the server (e.g., the encoder controller) instructing the encoder to accelerate encoding of the plurality of frames, as represented by block 934. In some embodiments, the second stream is further generated by facilitating blending of the UI into the second stream with the plurality of frames, as represented by block 936. The server then switches the client from the first stream to the second stream, as represented by block 940.

In some embodiments, the UI is generated by an application instance, and the application instance has access to a shared cache. Further, in some embodiments, the application instance obtains from the shared cache a rendered UI object corresponding to a UI element of the UI and composes the UI for the client using the rendered UI object. In some other embodiments, the application instance renders the UI for the client, e.g., by generating a rendered UI object corresponding to a UI element of the UI, and stores the rendered UI object to the shared cache.

For example, following the UI object sharing method 300 (FIG. 3), application instance 1 410-1 in FIG. 4 determines whether a rendered UI object corresponding to UI element 1 430-A1 of UI A 420-A exists in the shared UI object cache 120. In the case of locating rendered UI object 1 405-1, which corresponds to UI element 1 430-A1 in the shared UI object cache 120, application instance 1 410-1 saves computational resources by not re-rendering UI element 1 430-A1 and uses UI object 1 405-1 for composing UI A 420-A. On the other hand, in the case of not locating a rendered UI object corresponding to UI element x 430-Ax, application instance 1 410-1 renders UI element x 430-Ax and stores the rendered UI object in the shared UI object cache 120.

In some embodiments, the UI also includes a local application downloadable by the client for rendering a portion of the UI on the client, e.g., a local application for rendering a tile in a TV guide UI. In such embodiments, the server identifies the portion of the UI to be rendered on the client, e.g., based on the interactivity of the portion of the UI and/or capacities of the client device. The server further prepares the local application corresponding to the portion of the UI for the client, e.g., by embedding the local application in the plurality of frames or indicating to the client device to load the local application and/or supplying relevant data for the local application.

For example, in FIG. 6B, the local application generator 620 on the server 110-B prepares one or more local applications for the client device 180-B. The one or more local applications, data, metadata, and/or indicators associated with the one or more local applications are embedded with the videos from the encoders 140-B by the blender 150-B and delivered to the client device 180-B or downloaded separately from the videos. In some embodiments, the client device 180-B utilizes the local application engine 630 to download the one or more local applications and/or obtaining relevant data for the one or more local applications for rendering one or more elements locally on the client device 180-B for improved user experience.

In some embodiments, the server utilizes a pool of encoders to facilitate the generation of the second stream. To prepare the pool of encoders, in some embodiments, the server receives from the client device an offset of decoded position relative to the first stream, and instructs the pool of encoders to encode (including instructing the pool of re-encoders to decode and re-encode) the plurality of frames with varying delays relative to the first stream and within a threshold from the offset of decoded position. For example, in FIG. 8A, the server sets up encoders 2-4 in a ready-to-attach mode by mimicking the decoding delay of the client, e.g., instructing encoder 2 to delay encoding stream 2a 820a by 2 frames, instructing encoder 3 to encode stream 3 830 ahead by 10 frames, and instructing encoder 4 to delay encoding stream 4 840 by 10 frames relative to the offset of decoded position frame 78 in the stream 805.

Having prepared the pool of encoders, the server selects an encoder from the pool of encoders to serve the request for the UI. In some embodiments, locating the encoder that encodes the plurality of frames based on the first stream includes identifying a respective delay relative to encoding the plurality of frames into the first stream for each of the pool of encoders, and selecting the encoder from the pool of encoders based on the respective delay associated with the encoder being closest to the offset of decoded position. For example, in FIG. 8A, encoder 2 is selected because the difference between the delay of encoding stream 2a 820a from the common stream and the offset of decoded position in the stream 805 being played by the client is the smallest among streams 2a and 3-4 820a and 830-840, indicating that the encoding of stream 2a 820a by encoder 2 is the closest to the decoding of stream 2a 820 on the client.

In some embodiments, locating the encoder that encodes the plurality of frames based on the first stream includes identifying a switchover point to overlay the UI on the plurality of frames. In such embodiments, instructing the encoder to accelerate encoding of the plurality of frames includes instructing the encoder to accelerate encoding of the plurality of frames up to the switchover point in accordance with some embodiments. Further in such embodiments, facilitating blending of the UI into the second stream with the plurality of frames includes overlaying the UI on the plurality of frames starting at the switchover point in the second stream in accordance with some embodiments. Additionally in such embodiments, switching the client from the first stream to the second stream includes switching the client from the first stream to the second stream at the switchover point in accordance with some embodiments.

For example, in FIG. 8B, the server identifies frame 82 as the switchover point based on context, e.g., based on the decoding rate of the client, the encoding rate of the encoder, the timing of the UI request, network condition, current frame being displayed or decoded, current frame being encoded, and/or characteristics of the UI to be overlayed, etc. Further, the server instructs encoder 2 to accelerate the encoding as shown in FIG. 8B to close the gap and overlay the UI from frame 82 onward, e.g., generating the variant frame 82b 817b by overlaying the UI on frame 82. The server then switches the client device from the common stream 810 to stream 2b 820b.

In some embodiments, instead of maintaining a pool of encoders, the server locates any encoder that is available and can be activated to serve the request for the UI. In such embodiments, the server identifies a key frame in the first stream that was encoded prior to receiving the request for the UI and a switchover point starting from the key frame. As such, in some embodiments, instructing the encoder to accelerate encoding of the plurality of frames includes providing frames starting from the key frame to the encoder, and instructing the encoder to accelerate encoding of the frames starting from the key frame. Further, the server facilitates blending of the UI into the second stream with the plurality of frames by overlaying the UI on the plurality of frames starting at the switchover point in the second stream. Additionally, the server switches the client from the first stream to the second stream by switching the client from the first stream to the second stream at the switchover point.

For example, in FIG. 8C, the server identifies the last key frame 815 encoded prior to receiving the request for the UI and the switchover point 817c subsequent the key frame 815. The server then feeds the frames starting the last key frame 815 to encoder 2 and accelerates the encoding between the key frame 815 and the switchover point 817c. The server then blends the UI with the frame 817c at the switchover point 817c and onward and switches the client device from the common stream 810C to stream 2 820C at the switchover point 817c.

In some embodiments, to facilitate the stream switching, the server switches the client from the first stream to the second stream by providing to the client a link, e.g., a link used by the manifest selector 160 (FIG. 1), where the link points to a first set of segments in the first stream in a manifest prior to the switching, and replacing the link to the first set of segments with a link to a second set of segments in the second stream in the manifest in response to receiving the request for the UI. Further, in some embodiments, at the end of the UI display, the server switches the client from the second stream back to the first stream. For example, in FIG. 7A, prior to the switching, the link provided to the client devices 180 points to the common stream. In FIG. 7B, in response to the request for the UI by client 1 180-1, the link provided to the client 1 180-1 is updated such that it points to stream 1. In FIG. 7C, at the end of the UI, e.g., the client device ceases to display the UI, the server updates the link again to point to the common stream.

Figure 10:
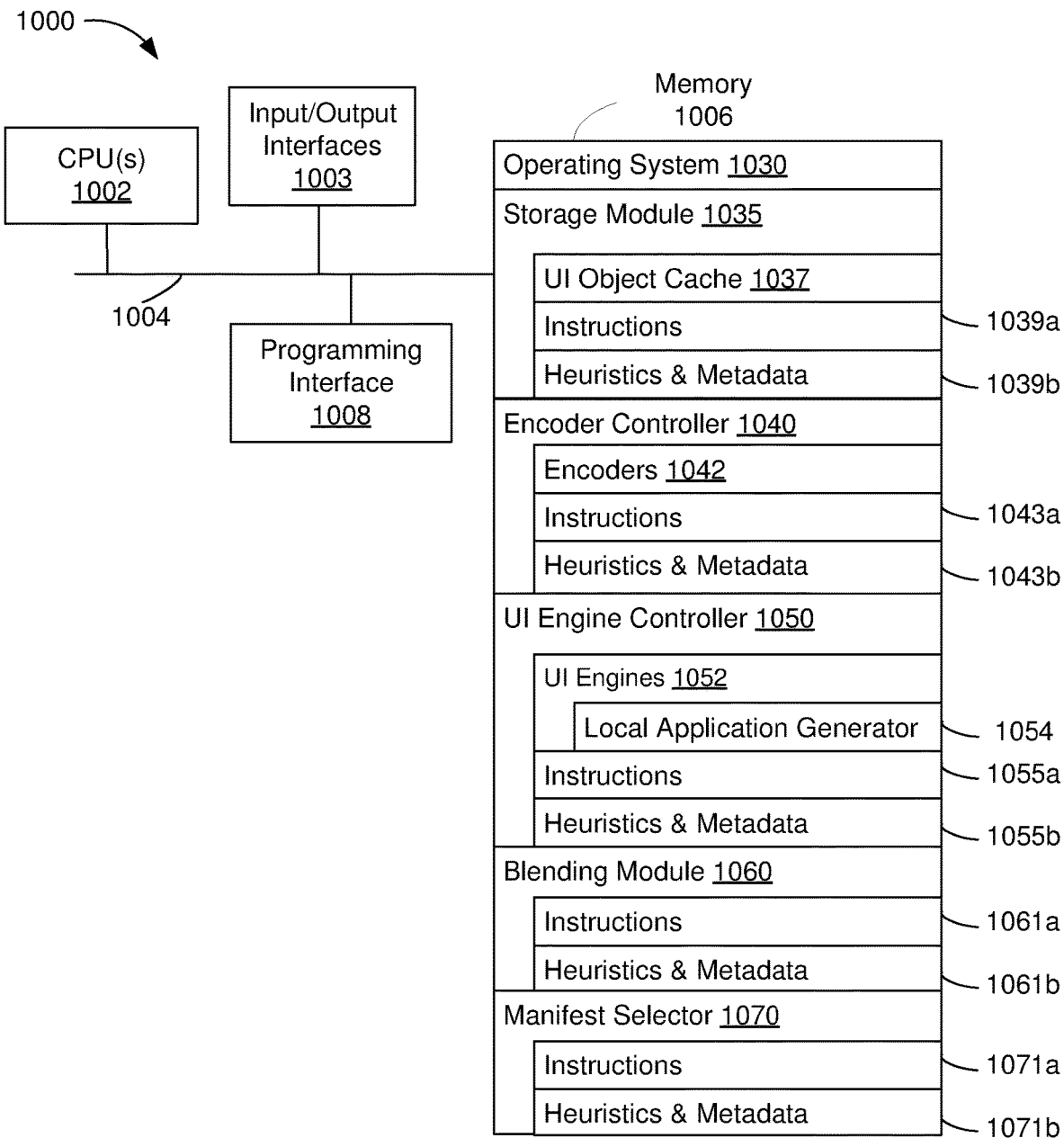
FIG. 10 is a block diagram of a computing device for the exemplary virtual set top system, in accordance with some embodiments.

FIG. 10 is a block diagram of a computing device 1000 in an exemplary virtual set top system in accordance with some embodiments. In some embodiments, the computing device 1000 corresponds to the server 110 in FIG. 1 and performs one or more of the functionalities described above with respect to the server 110. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPUs) 1002 (e.g., processors), one or more input/output interfaces 1003 (e.g., input devices, a network interface, a display, etc.), a memory 1006, a programming interface 1008, and one or more communication buses 1004 for interconnecting these and various other components.

In some embodiments, the communication buses 1004 include circuitry that interconnects and controls communications between system components. The memory 1006 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some embodiments, the memory 1006 or the non-transitory computer readable storage medium of the memory 1006 stores the following programs, modules and data structures, or a subset thereof including an optional operating system 1030, a storage module 1035, an encoder controller 1040, a UI engine controller 1050, a blending module 1060, and a manifest selector 1070. In some embodiments, one or more instructions are included in a combination of logic and non-transitory memory. The operating system 1030 includes procedures for handling various basic system services and for performing hardware dependent tasks.

In some embodiments, the storage module 1035 is configured to store rendered UI objects in a UI object cache 1037, e.g., the UI object cache 120 in FIG. 1. To that end, the storage module 1035 includes a set of instructions 1039a and heuristics and metadata 1039b.

In some embodiments, the encoder controller 1040 is configured to maintain a pool of encoders 1042 (e.g., the encoders/re-encoders 140 in FIG. 1) and/or select an encoder from the encoders 1042 for encoding frames into streams. To that end, the encoder controller 1040 includes a set of instructions 1043a and heuristics and metadata 1043b.

In some embodiments, the UI engine controller 1050 is configured to maintain a pool of UI engines 1052 (e.g., the UI engines 130, FIG. 1) for UI rendering. In some embodiments, the UI engines 1052 include a local application generator 1054 (e.g., the local application generator 620, FIG. 6B) for generating local applications for client devices. To that end, the UI engine controller 1050 includes a set of instructions 1055a and heuristics and metadata 1055b.

In some embodiments, the blending module 1060 (e.g., the blender 150, FIG. 1) is configured to blend the UI, the local application for rendering at least a portion of the UI, and/or data, indicator(s), and/or metadata for the location application with the videos. To that end, the blending module 1060 includes a set of instructions 1061a and heuristics and metadata 1061b.

In some embodiments, the manifest selector 1070 (e.g., the manifest selector 160, FIG. 1) is configured to provide links to segments in the streams to the client devices. To that end, the manifest selector 1070 includes a set of instructions 1071a and heuristics and metadata 1071b.

Although the storage model 1035, the encoder controller 1040, the UI engine controller 1050, the blending module 1060, and the manifest selector 1070 are illustrated as residing on a single computing device 1000, it should be understood that in other embodiments, any combination of the storage model 1035, the encoder controller 1040, the UI engine controller 1050, the blending module 1060, and the manifest selector 1070 can reside in separate computing devices in various embodiments. For example, in some embodiments, each of the storage model 1035, the encoder controller 1040, the UI engine controller 1050, the blending module 1060, and the manifest selector 1070 resides on a separate computing device.

Moreover, FIG. 10 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

Figure 11:
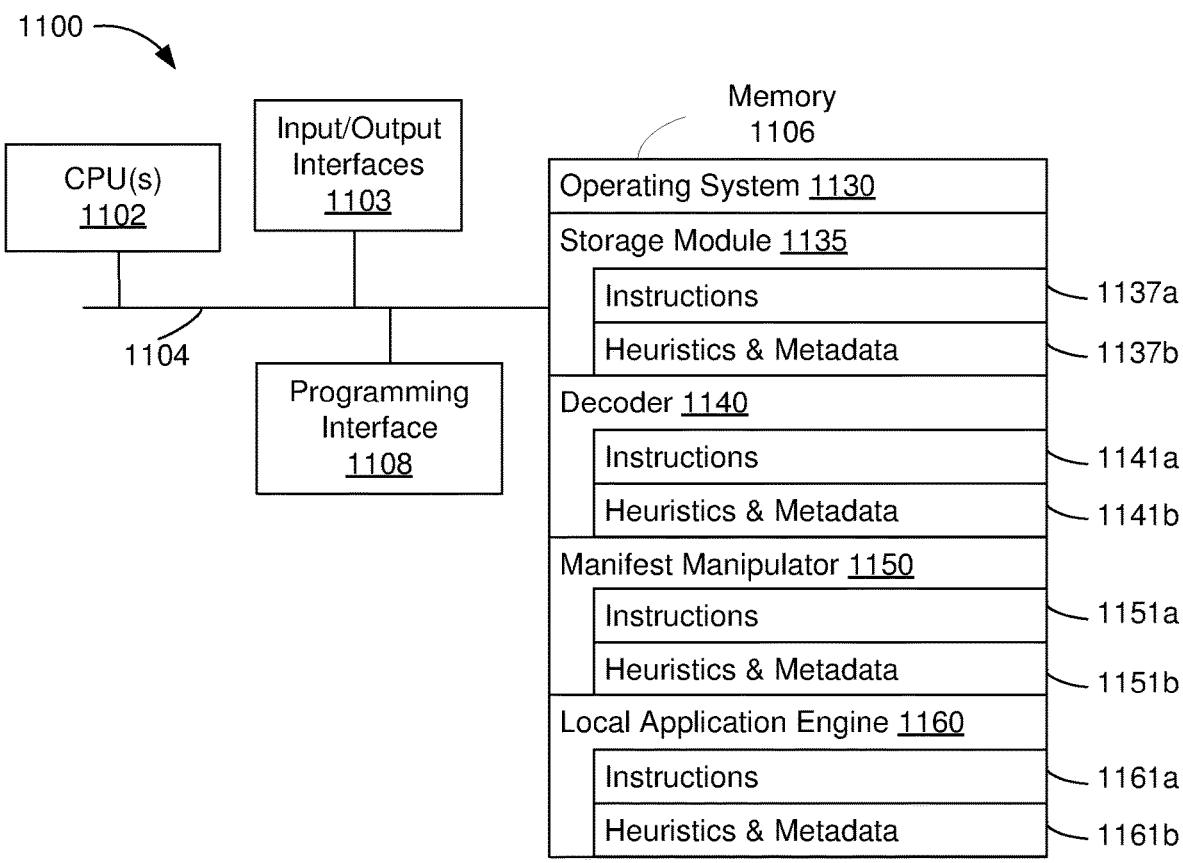
FIG. 11 is a block diagram of another computing device for the exemplary virtual set top system, in accordance with some embodiments.

FIG. 11 is a block diagram of a computing device 1100 in an exemplary virtual set top system in accordance with some embodiments. In some embodiments, the computing device 1100 corresponds to one of the client devices 180 in FIG. 1 and performs one or more of the functionalities described above with respect to the client device 180. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1100 includes one or more processing units (CPUs) 1102 (e.g., processors), one or more input/output interfaces 1103 (e.g., input devices, sensors, a network interface, a display, etc.), a memory 1106, a programming interface 1108, and one or more communication buses 1104 for interconnecting these and various other components.

In some embodiments, the communication buses 1104 include circuitry that interconnects and controls communications between system components. The memory 1106 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 1106 optionally includes one or more storage devices remotely located from the CPU(s) 1102. The memory 1106 comprises a non-transitory computer readable storage medium. Moreover, in some embodiments, the memory 1106 or the non-transitory computer readable storage medium of the memory 1106 stores the following programs, modules and data structures, or a subset thereof including an optional operating system 1130, a storage module 1135, a decoder 1140, a manifest manipulator 1150, and a local application engine 1160. In some embodiments, one or more instructions are included in a combination of logic and non-transitory memory. The operating system 1130 includes procedures for handling various basic system services and for performing hardware dependent tasks.

In some embodiments, the storage module 1135 is configured to provide storage for decoding, rendering, and/or displaying media content. To that end, the storage module 1135 includes a set of instructions 1137a and heuristics and metadata 1137b.

In some embodiments, the decoder 1140 (e.g., the decoder 182, FIG. 1) is configured to decode the stream(s) from the server. To that end, the decoder 1140 includes a set of instructions 1141a and heuristics and metadata 1141b.

In some embodiments, the manifest manipulator 1150 (e.g., the manifest manipulator 184, FIG. 1) is configured to manipulate links to media streams, e.g., to a common stream, to unique personal segments, and/or to link to the manifest selector on the server side. To that end, the manifest manipulator 1150 includes a set of instructions 1151a and heuristics and metadata 1151b.

In some embodiments, the local application engine 1160 (e.g., the local application engine 630, FIG. 6B) is configured to download one or more local applications and use the application(s) to render UI locally. To that end, the local application engine 1160 includes a set of instructions 1161a and heuristics and metadata 1161b.

Although the storage model 1135, the decoder 1140, the manifest manipulator 1150, and the local application engine 1160 are illustrated as residing on a single computing device 1100, it should be understood that in other embodiments, any combination of the storage model 1135, the decoder 1140, the manifest manipulator 1150, and the local application engine 1160 can reside in separate computing devices in various embodiments. For example, in some embodiments, each of the storage model 1135, the decoder 1140, the manifest manipulator 1150, and the local application engine 1160 resides on a separate computing device.

Moreover, FIG. 11 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at one or more servers hosting user interface (UI) engines for rendering UIs and encoders for encoding or re-encoding the rendered UIs, wherein the one or more servers include one or more processors and a non-transitory memory:
receiving a request for a personalized UI for a client in a viewing session while a common stream without UI elements is streamed to a plurality of viewing sessions at a plurality of clients, wherein the common stream without the UI elements is encoded using a common encoder shared by the plurality of viewing sessions and provided to the plurality of clients including the client;
instructing the encoders to obtain the plurality of frames in the common stream and encode the plurality of frames with varying delays relative to the common stream;
rendering, by one of the UI engines, the personalized UI unique to the viewing session for the client in response to the request;
instructing an encoder, selected from the encoders and different from the common encoder, to accelerate encoding of a plurality of frames up to a switchover point and encode the rendered personalized UI blended with the plurality of frames starting at the switchover point in a unique stream for the client; and
updating at least one link in a manifest to the client to switch the client from the common stream to the unique stream at the switchover point to trigger the client to decode and display the unique stream in the viewing session without re-rendering the personalized UI.

2. The method of claim 1, further comprising:
maintaining a pool of virtualized set-top-boxes (STBs) to render UIs for multiple clients, wherein the pool of virtualized STBs shares a cache storing rendered UI objects that are rendered for the multiple clients; and
selecting a virtualized STB from the pool to render the personalized UI for the client in response to the request.

3. The method of claim 2, wherein rendering the personalized UI for the client in response to the request includes:
obtaining, by the virtualized STB, from the cache, a rendered UI object corresponding to a UI element of the personalized UI; and
composing, by the virtualized STB, the personalized UI for the client using the rendered UI object.

4. The method of claim 2, wherein rendering the personalized UI for the client in response to the request includes:
generating, by the virtualized STB, a rendered UI object corresponding to a UI element of the personalized UI; and
storing, by the virtualized STB, the rendered UI object in the cache.

5. The method of claim 1, further comprising:
receiving requests from multiple clients for a video that includes the plurality of frames; and
providing the common stream to the multiple clients in response to the requests, including providing a link pointing to the common stream in the manifest.

6. The method of claim 1, wherein the unique stream is provided to the client in a low latency mode and unique to the request from the client.

7. The method of claim 1, further comprising:
merging the client from the unique stream to the common stream by switching a linking pointing to the personalized UI to a link pointing to the common stream in the manifest provided to the client.

8. The method of claim 1, wherein the switchover point is selected based at least in part on characteristics of the personalized UI requested, network conditions, and client decoding conditions.

9. A system comprising:
one or more servers hosting user interface (UI) engines for rendering UIs and encoders for encoding or re-encoding the rendered UIs, wherein the one or more servers include one or more processors, a non-transitory memory, and one or more programs stored in the non-transitory memory, which, when executed, cause the one or more processors to perform operations comprising:
receiving a request for a personalized UI for a client in a viewing session while a common stream without UI elements is streamed to a plurality of viewing sessions at a plurality of clients, wherein the common stream without the UI elements is encoded using a common encoder shared by the plurality of viewing sessions and provided to the plurality of clients including the client;
instructing the encoders to obtain the plurality of frames in the common stream and encode the plurality of frames with varying delays relative to the common stream;
rendering, by one of the UI engines, the personalized UI unique to the viewing session for the client in response to the request;
instructing an encoder, selected from the encoders and different from the common encoder, to accelerate encoding of a plurality of frames up to a switchover point and encode the rendered personalized UI blended with the plurality of frames starting at the switchover point in a unique stream for the client; and updating at least one link in a manifest to the client to switch the client from the common stream to the unique stream at the switchover point to trigger the client to decode and display the unique stream in the viewing session without re-rendering the personalized UI.

10. The system of claim 9, wherein the one or more programs further cause the one or more processors to perform the operations including:
maintaining a pool of virtualized set-top-boxes (STBs) to render UIs for multiple clients, wherein the pool of virtualized STBs shares a cache storing rendered UI objects that are rendered for the multiple clients; and
selecting a virtualized STB from the pool to render the personalized UI for the client in response to the request.

11. The system of claim 10, wherein rendering the personalized UI for the client in response to the request includes:
obtaining, by the virtualized STB, from the cache, a rendered UI object corresponding to a UI element of the personalized UI; and
composing, by the virtualized STB, the personalized UI for the client using the rendered UI object.

12. The system of claim 10, wherein rendering the personalized UI for the client in response to the request includes:
generating, by the virtualized STB, a rendered UI object corresponding to a UI element of the personalized UI; and
storing, by the virtualized STB, the rendered UI object in the cache.

13. The system of claim 9, wherein the one or more programs further cause the one or more processors to perform the operations including:
receiving requests from multiple clients for a video that includes the plurality of frames; and
providing the common stream to the multiple clients in response to the requests, including providing a link pointing to the common stream in the manifest.

14. The system of claim 9, wherein the unique stream is provided to the client in a low latency mode and unique to the request from the client.

15. The system of claim 9, wherein the one or more programs further cause the one or more processors to perform the operations including:
merging the client from the unique stream to the common stream by switching a linking pointing to the personalized UI to a link pointing to the common stream in the manifest provided to the client.

16. The system of claim 9, wherein the switchover point is selected based at least in part on characteristics of the UI requested, network conditions, and client decoding conditions.

17. A non-transitory memory storing one or more programs, which, when executed by one or more processors of one or more servers, wherein the one or more servers host user interface (UI) engines for rendering UIs and encoders for encoding or re-encoding the rendered UIs, cause the one or more servers to:
receive a request for a personalized UI for a client in a viewing session while a common stream without UI elements is streamed to a plurality of viewing sessions at a plurality of clients, wherein the common stream without the UI elements is encoded using a common encoder shared by the plurality of viewing sessions and provided to the plurality of clients including the client;
instruct the encoders to obtain the plurality of frames in the common stream and encode the plurality of frames with varying delays relative to the common stream;
rendering, by one of the UI engines, the personalized UI unique to the viewing session for the client in response to the request;
instruct an encoder, selected from the encoders and different from the common encoder, to accelerate encoding of a plurality of frames up to a switchover point and encode the rendered personalized UI blended with the plurality of frames starting at the switchover point in a unique stream for the client; and
update at least one link in a manifest to the client to switch the client from the common stream to the unique stream at the switchover point to trigger the client to decode and display the unique stream in the viewing session without re-rendering the personalized UI.

18. The non-transitory memory of claim 17, wherein the one or more programs, when executed by the one or more processors, further cause the one or more devices to:
maintain a pool of virtualized set-top-boxes (STBs) to render UIs for multiple clients, wherein the pool of virtualized STBs shares a cache storing rendered UI objects that are rendered for the multiple clients; and
select a virtualized STB from the pool to render the personalized UI for the client in response to the request.

19. The non-transitory memory of claim 18, wherein rendering the personalized UI for the client in response to the request includes:
obtaining, by the virtualized STB, from the cache, a rendered UI object corresponding to a UI element of the personalized UI; and
composing, by the virtualized STB, the personalized UI for the client using the rendered UI object.

20. The non-transitory memory of claim 18, wherein rendering the personalized UI for the client in response to the request includes:
generating, by the virtualized STB, a rendered UI object corresponding to a UI element of the personalized UI; and
storing, by the virtualized STB, the rendered UI object in the cache.

* * * * *